United States Patent
Chun et al.

(10) Patent No.: US 8,548,084 B2
(45) Date of Patent: Oct. 1, 2013

(54) METHOD FOR TRANSMITTING DATA IN A RADIO COMMUNICATION SYSTEM

(75) Inventors: Jin Young Chun, Anyang-si (KR); Bin Chul Ihm, Anyang-si (KR); Woo Suk Kwon, Anyang-si (KR); Wook Bong Lee, Anyang-si (KR); Suk Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 68 days.

(21) Appl. No.: 13/130,733

(22) PCT Filed: Aug. 26, 2009

(86) PCT No.: PCT/KR2009/004757
§ 371 (c)(1),
(2), (4) Date: May 23, 2011

(87) PCT Pub. No.: WO2010/062023
PCT Pub. Date: Jun. 3, 2010

(65) Prior Publication Data
US 2011/0222628 A1    Sep. 15, 2011

Related U.S. Application Data

(60) Provisional application No. 61/117,938, filed on Nov. 25, 2008.

(30) Foreign Application Priority Data

May 13, 2009    (KR) .......................... 10-2009-0041851

(51) Int. Cl.
*H04B 7/02* (2006.01)
*H04L 1/02* (2006.01)

(52) U.S. Cl.
USPC .......................................................... 375/267

(58) Field of Classification Search
USPC .................................................................. 375/267
See application file for complete search history.

(56) References Cited

U.S. PATENT DOCUMENTS

| | | | |
|---|---|---|---|
| 2009/0011767 A1* | 1/2009 | Malladi et al. | 455/450 |
| 2009/0122884 A1* | 5/2009 | Vook et al. | 375/260 |
| 2009/0279626 A1* | 11/2009 | Wang | 375/260 |
| 2011/0002430 A1* | 1/2011 | Kim et al. | 375/362 |

FOREIGN PATENT DOCUMENTS

| | | | |
|---|---|---|---|
| KR | 10-2003-0023140 A | | 3/2003 |
| KR | 10-2007-0030291 A | | 3/2007 |
| WO | WO 2008/009157 A1 | | 1/2008 |

* cited by examiner

*Primary Examiner* — Chieh M Fan
*Assistant Examiner* — Tanmay Shah
(74) *Attorney, Agent, or Firm* — McKenna Long & Aldridge LLP

(57) ABSTRACT

A method for transmitting data in a wireless communication system comprises: receiving synchronization signals and midambles transmitted through a plurality of antennas; and estimating each channel of the plurality of antennas by using the synchronization signals and the midambles, wherein the synchronization signals and the midambles are transmitted such that the channels of the plurality of antennas are combined. Respective channel states of a plurality of antennas can be estimated by using the synchronization signals and the midambles, and data can be effectively transmitted.

5 Claims, 7 Drawing Sheets

METHOD FOR TRANSMITTING DATA IN A RADIO COMMUNICATION SYSTEM

This application is a 35 U.S.C. § 371 National Stage entry of International Application No. PCT/KR2009/004757, filed on Aug. 26, 2009, and claims priority to U.S. Provisional Application No. 61/117,938, filed Nov. 25, 2008 and Korean Application No. 10-2009-0041851, filed May 13, 2009 each of which is hereby incorporated by reference in its entirety as if fully set forth herein.

TECHNICAL FIELD

The present invention relates to a data transmission method in a wireless communication system and, more particularly, to a data transmission method for estimating a channel by using a synchronization signal and a midamble.

BACKGROUND ART

Recently, a multiple input multiple output (MIMO) system receives much attention to maximize the performance and communication capacity of a wireless communication system. Emerging from the use of a single transmission antenna and a single reception antenna as it has been to date, the MIMO technique employs multiple transmission antennas and multiple reception antennas to enhance data transmission/reception efficiency. The MIMO system, also called a multiple antenna system, is an application of a technique that collects data fragments received via several antennas for completion, rather than relying on a single antenna path, to receive a single overall message. As a result, a data transfer rate at a particular range can be improved or system coverage can be increased over a particular data transfer rate.

The MIMO technique includes transmit diversity, spatial multiplexing, beamforming, and the like. The transmit diversity is a technique that transmits the same data from multiple transmission antennas to thus enhance a transmission reliability. Spatial multiplexing is a technique that simultaneously transmits different data from multiple transmission antennas to thus transmit high speed data without increasing a bandwidth of a system. Beamforming is used to increase a signal to interference plus noise ratio (SINR) of a signal by applying a weight value according to a channel state at multiple antennas. In this case, the weight value may be represented by a weight vector or a weight matrix, and it is called a precoding vector or a precoding matrix.

spatial multiplexing includes spatial multiplexing for a single user and spatial multiplexing for multiple users. The spatial multiplexing for a single user is called a single user MIMO (SU-MIMO), and the spatial multiplexing for multiple users is called spatial division multiple access (SDMA) or multi-user MIMO (MU-MIMO). The capacity of a MIMO channel increases in proportion to the number of antennas. The MIMO channel may be disintegrated into independent channels. If the number of transmission antennas is Nt and the number of reception antennas is Nr, the number of independent channels Ni is Ni≤min{Nt, Nr}. Each independent channel may be a spatial layer. A rank is the number of non-zero eigenvalue of the MIMO channel, which may be defined as the number of spatial streams that can be multiplexed.

A synchronization signal is transmitted by a base station (BS) to align physical synchronization of time and frequency. The synchronization signal may indicate segment information and the ID (Identifier) of the BS by using a particular sequence. A midamble is a signal for a channel estimation transmitted by the BS in order to obtain a channel state of each antenna in the MIMO system using a plurality of antennas. A user equipment (UE) may receive the synchronization signal, be physically synchronized with the BS, obtain BS information, and receive a midamble to estimate a channel state of each antenna of the BS.

The synchronization signal may be transmitted via a plurality of synchronization channels (SCH). For example, the synchronization channel may be divided into a channel for aligning physical synchronization and a channel for indicating segment information and the ID of the BS. In the MIMO system, a method of using the synchronization signal as well as the midamble may be considered in order to obtain the channel state of each antenna, but has not been clearly proposed yet.

Thus, a method for estimating a channel state of each antenna by using a synchronization signal and a midamble in the MIMO system is required.

DISCLOSURE

Technical Problem

An object of the present invention is to provide a method for effectively transmitting data by estimating a channel state by using a synchronization signal and a midamble.

Technical Solution

As one aspect of the present invention provides a method for transmitting data in a wireless communication system including: receiving synchronization signals and midambles transmitted through a plurality of antennas; and estimating each channel of the plurality of antennas by using the synchronization signals and the midambles, wherein the synchronization signals and the midambles are transmitted such that the channels of the plurality of antennas are combined.

Advantageous Effects

A channel state of each of a plurality of antennas can be estimated by using a synchronization signal and a midamble, and data can be effectively transmitted.

MODE FOR INVENTION

The following technique may be used in various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented by a radio technology such as universal terrestrial radio access (UTRA) or CDMA2000. The TDMA may be implemented by a radio technology such as a global system for mobile communications (GSM)/general packet radio service (GPRS)/enhanced data rates for GSM evolution (EDGE). The OFDMA may be implemented by a radio technology such as IEEE (Institute of Electrical and Electronics Engineers) 802.11 (Wi-Fi), IEEE 802.16 (WiMAX), IEEE 802.20, E-UTRA (Evolved UTRA), and the like. The UTRA is a part of a universal mobile telecommunications system (UMTS). 3GPP ($3^{rd}$ Generation Partnership Project) LTE (Long Term Evolution) is a part of an evolved UMTS (E-UMTS) using the E-UTRA, which employs the OFDMA in downlink and the SC-FDMA in uplink. IEEE 802.16m is an evolution of the IEEE 802.16e.

Figure 1:
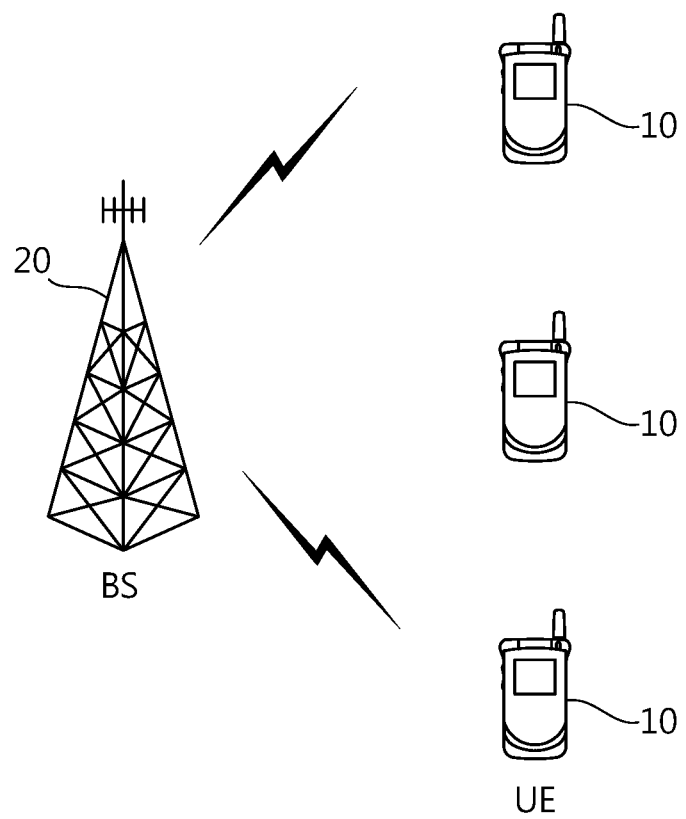
FIG. 1 illustrates a wireless communication system.

FIG. 1 illustrates a wireless communication system.

With reference to FIG. 1, the wireless communication system includes at least one base station (BS) 20. Each BS 20 provides a communication service to particular geographical areas (which are generally called cells). Each cell may be divided into a plurality of areas (which are called sectors). A user equipment (UE) 10 may be fixed or mobile, and may be referred to by other terminologies such as mobile station (MS), user terminal (UT), subscriber station (SS), wireless device, personal digital assistant (PDA), wireless modem, handheld device, etc. The BS 20 generally refers to a fixed station that communicates with the UE 10 and may be called by other terminologies such as evolved-node B (eNB), base transceiver system (BTS), access point (AP), etc.

Hereinbelow, downlink (DL) refers to communication from the BS to the UE, and uplink (UL) refers to communication from the UE to the BS. In downlink, a transmitter may be a part of the BS and a receiver may be a part of the UE. In uplink, a transmitter may be a part of the UE and a receiver may be a part of the BS.

The wireless communication system may be a multiple antenna system. The multiple antenna system may be a multiple-input multiple-output (MIMO) system. Or, the multiple antenna system may be a multiple-input single-output (MISO) system, a single-input single-output (SISO) system, or a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas.

Figure 2:
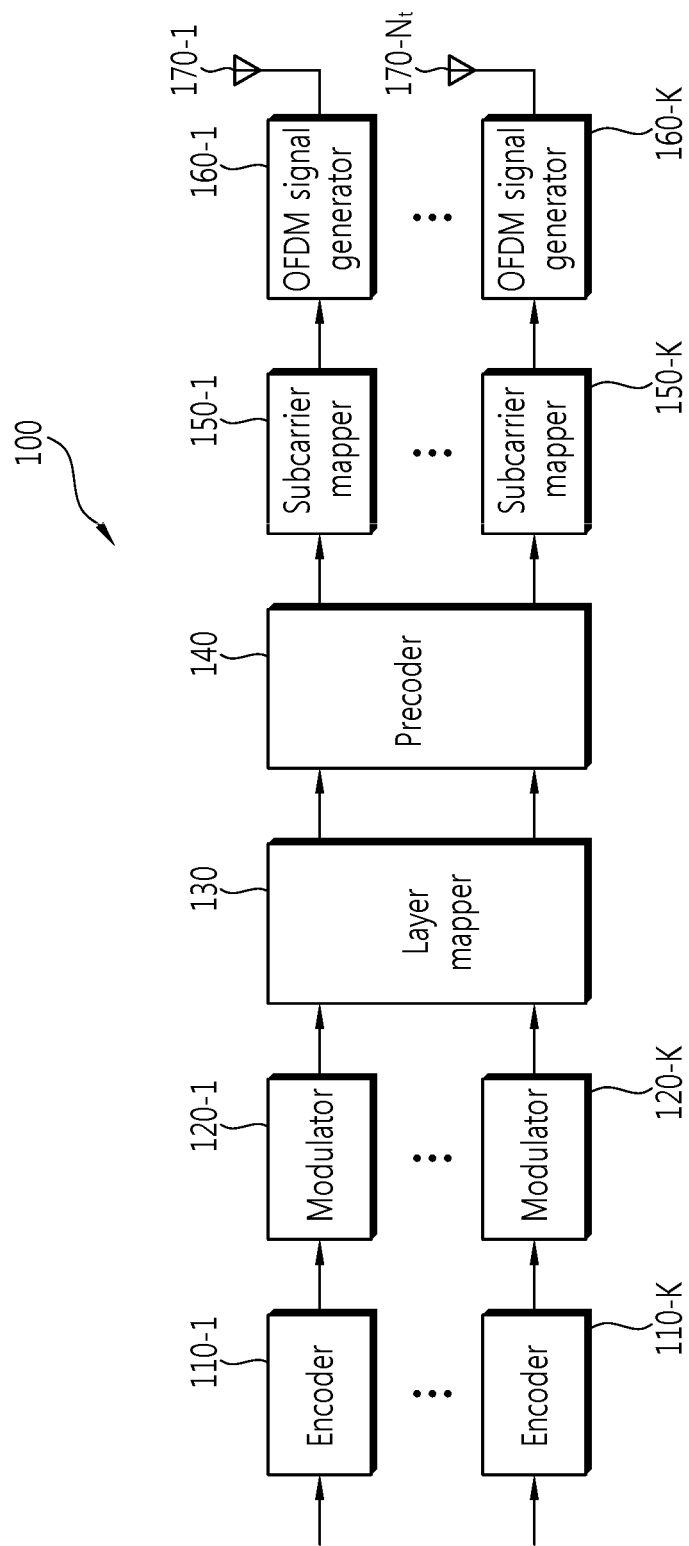
FIG. 2 is a schematic block diagram of a transmitter having multiple antennas.

FIG. 2 is a schematic block diagram of a transmitter according to an exemplary embodiment of the present invention.

With reference to FIG. 2, the transmitter 100 includes encoders 110-1, . . . , 110-K, modulators 120-1, . . . , 120-K, a layer mapper 130, a precoder 140, subcarrier mappers 150-1, . . . , 150-K, and OFDM signal generators 160-1, . . . , 160-K. The transmitter 100 further includes Nt (Nt≥1) number of transmission antennas 170-1, . . . , 170-Nt.

The encoders 110-1, . . . , 110-K encode input data according to a predetermined coding scheme to form coded data.

The modulators 120-1, . . . , 120-K dispose the coded data as symbols representing positions on a signal constellation. There is no limitation in the modulation scheme, and the modulation scheme may be m-phase shift keying (m-PSK) or m-quadrature amplitude modulation (m-QAM). For example, m-PSK may be BPSK, QPSK, or 8-PSK, and the m-QAM may be 16-QAM, 64-QAM, or 256-QAM.

The layer mapper 130 defines layers of the input symbols to so that the precoder 140 can distribute antenna-specific symbols to paths of the respective antennas. The layers are defined as information paths input to the precoder 140.

Information paths before the precoder 140 may be called virtual antennas or layers. The precoder 140 processes the input symbols according to the MIMO scheme based on the multiple transmission antennas 170-1, . . . , 170-Nt. The precoder 140 may perform precoding on input information symbols $(u_1, \ldots, u_K)$ to generate input symbols $(x_1, \ldots, x_K)$. Precoding is a scheme for preprocessing information symbols to be transmitted, and the precoding scheme includes RBF (random beamforming), ZFBF (zero forcing beamforming), or the like, that generates input symbols by applying a weight vector, a precoding matrix, or the like, to the information symbols to be transmitted. The precoder 140 may use codebook-based precoding. The precoder 140 distributes the antenna-specific symbols to the subcarrier mappers 150-1, . . . , 150-K of the paths of corresponding antennas. Each information path sent to a single antenna via a single subcarrier mapper by the precoder 140 is called a stream, which may be called a physical antenna.

The subcarrier mappers 150-1, . . . , 150-K allocate the input symbols to proper subcarriers and multiplex them according to users. The OFDM signal generators 160-1, . . . , 160-K modulate the input symbols according to the OFDM scheme and output OFDM symbols. The OFDM signal generators 160-1, . . . , 160-K may perform inverse fast Fourier transform (IFFT) on the input symbols, and a cyclic prefix (CP) may be inserted into the time domain symbols on which IFFT has been performed. The OFDM symbols are transmitted via the respective transmission antennas 170-1, . . . , 170-Nt.

In the MIMO system, the transmitter 100 may operate in two types of modes: an SCW mode and an MCW mode. In the SCW mode, transmission signals transmitted via the MIMO channels have the same data rate. In the MCW mode, data transmitted via the MIMO channels are independently encoded, so transmission signals may have different transmission rates. The MCW mode is operated when the rank is 2 or greater.

Figure 3:
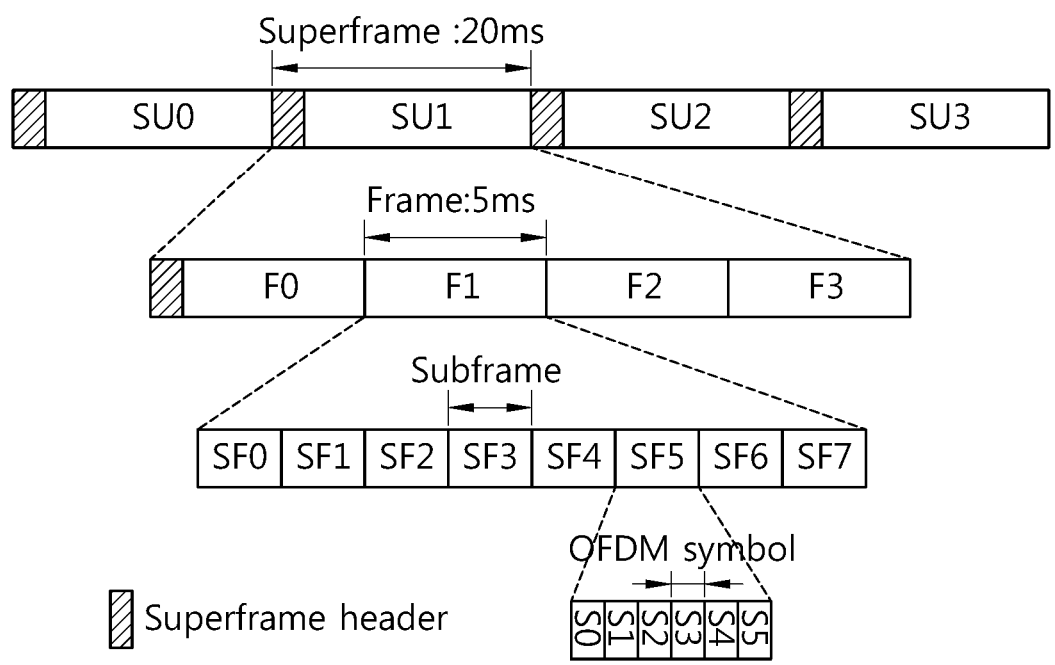
FIG. 3 illustrates an example of a frame structure.

FIG. 3 illustrates a frame structure.

With reference to FIG. 3, a superframe (SU) includes a superframe header and four frames (F0, F1, F2, and F3). It is illustrated that each superframe has a size of 20 ms and each frame has a size of 5 ms, but the present invention is not limited thereto. The superframe header may be disposed at the headmost portion, to which a common control channel is allocated. The common control channel is a channel used to transmit control information, such as information regarding frames constituting the superframe or system information, which can be commonly utilized by every UE in a cell.

One frame includes eight subframes (SF0, SF1, SF2, SF3, SF4, SF5, SF6, and SF7). Each subframe may be used for uplink or downlink transmission. Each subframe may include six to seven OFDM symbols, but this is merely illustrative. A time division duplexing (TDD) scheme or a frequency division duplexing (FDD) scheme may be applied to the frame. In the TDD scheme, each subframe is used for uplink transmission or downlink transmission at mutually different time at the same frequency. That is, subframes in a frame in the TDD scheme are discriminated into uplink subframes and downlink subframes in a time domain. In the FDD scheme, each subframe is used for uplink transmission or downlink transmission at mutually different frequencies during the same time duration. That is, the subframes in a frame in the FDD scheme are discriminated into uplink subframes and downlink subframes in a frequency domain. The uplink transmission and the downlink transmission may occupy mutually different frequency bands and may be performed at the same time.

A subframe includes at least one frequency partition. The frequency partition includes at least one physical resource unit (PRU). The frequency partition may include localized PRUs and/or distributed PRUs. The frequency partition may be used for the purpose of fractional frequency reuse (FFR) or multicast and broadcast services (MBS).

The PRU is defined as a basic physical unit for resource allocation, including a plurality of contiguous OFDM symbols and a plurality of contiguous subcarriers. The number of OFDM symbols included in a PRU may be the same as the number of OFDM symbols included in a single subframe. For example, when a single subframe includes six OFDM symbols a PRU may be defined to include 18 subcarriers and six OFDM symbols. A logical resource unit (LRU) is a basic logical unit for a distributed resource allocation and a localized resource allocation. The LRU is defined to include a plurality of OFDM symbols and a plurality of subcarriers and includes pilots used in the PRU. Accordingly, a proper number of subcarriers in a single LRU is dependent upon the number of allocated pilots.

A logical distributed resource unit (DRU) may be used to obtain a frequency diversity gain. The DRU includes a group of subcarriers distributed in a single frequency partition. The size of the DRU is the same as that of the PRU. The minimum unit for forming the DRU is one subcarrier.

A logical contiguous resource unit (CRU) may be used to obtain a frequency selective scheduling gain. The CRU may include a localized subcarrier group. The size of the CRU is the same as that of the PRU.

Figure 4:
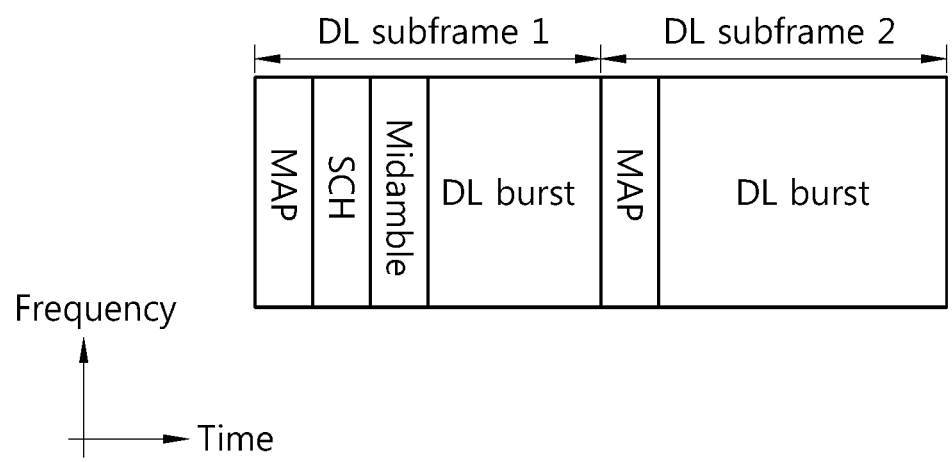
FIG. 4 is a view showing the disposition of a synchronization channel and a midamble in a downlink (DL) subframe according to an exemplary embodiment of the present invention.

FIG. 4 is a view showing the disposition of a synchronization channel and a midamble in a downlink (DL) subframe according to an exemplary embodiment of the present invention.

With reference to FIG. 4, a downlink subframe may include a MAP, a synchronization channel (SCH), a midamble, a DL burst, and the like. The synchronization channel (SCH) and the midamble may be disposed to be contiguous in a single DL subframe. When the synchronization channel (SCH) and the midamble are disposed to be contiguous, channel estimation for each antenna can be more accurately performed by using the synchronization channel (SCH).

The MAP indicates the position and size information of the synchronization channel (SCH), the midamble, the DL burst, and the like, included in the DL subframe. The MAP may be mapped to the headmost OFDM symbol of the DL subframe. The MAP may be included in every DL subframe, while the synchronization channel (SCH) and the midamble may not be included in all DL subframes.

The synchronization channel is a DL physical channel for transmitting a synchronization signal. A reference signal (or pilot) for time synchronization, frequency synchronization, frame synchronization, channel estimation, a BS ID, or the like, may be transmitted through the synchronization channel. The synchronization channel may be divided into a P-SCH (primary synchronization channel) for time and frequency and frame synchronization and an S-SCH (secondary synchronization channel) for a channel estimation and a BS ID. The P-SCH and the S-SCH include at least one OFDM symbol. In order to discriminate three segments, the S-SCH may be used upon being divided into subcarrier units of 3 k, 3 k+1, and 3 k+2, and N number of orthogonal sequences may be selectively mapped to the respective segments (k= 0, 1, . . . , N−1 and 3(N−1)+2 is smaller than or equal to the number of subcarriers in use). The three segments indicate three sector IDs. The P-SCH and the S-SCH may be included in the same DL subframe or different DL subframes. The P-SCH and the S-SCH may have different periods. A synchronization signal through the P-SCH may be transmitted in units of one superframe or frame, and a synchronization signal through the S-SCH may be transmitted in units of a plurality of superframes or frames.

A symbol for obtaining a channel state of each antenna is mapped to the midamble in the MIMO system using multiple antennas. The midamble may occupy at least one OFDM symbol. Symbols for each antenna may be mapped to the midamble such that they do not overlap with each other. Whether or not the midamble is included or configuration information may be indicated by the MAP. The midamble may be disposed to be contiguous to the synchronization channel to allow for an accurate channel estimation by using the synchronization channel. Here, the synchronization channel may be an S-SCH for a channel estimation.

User data or control information may be mapped to the DL burst. A plurality of user data or control information may be multiplexed in the DL burst and information about it may be indicated by the MAP.

The disposition of the MAP, the synchronization channel, the midamble, and the DL burst is not limited. For example, although it is illustrated that the synchronization channel is included in the DL subframe, the synchronization channel may occupy at least one OFDM symbol prepared between two DL subframes, rather than being included in the DL subframe. The midamble may be disposed at a certain OFDM symbol of the DL subframe, and in this case, the midamble may be disposed to be as contiguous as possible to the synchronization channel in order to estimate a channel of each antenna of the MIMO system using the synchronization channel and the midamble.

Figure 5:
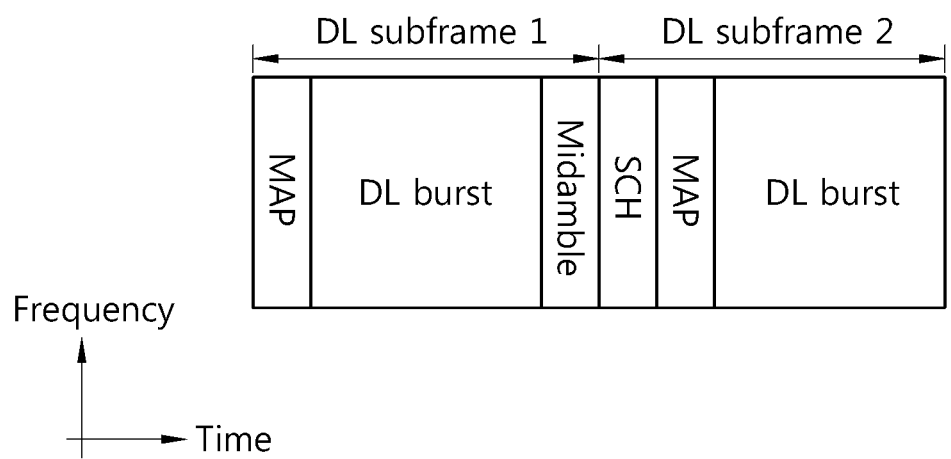
FIG. 5 is a view showing the disposition of a synchronization channel and a midamble in a DL subframe according to another exemplary embodiment of the present invention.

FIG. 5 is a view showing the disposition of a synchronization channel and a midamble in a DL subframe according to another exemplary embodiment of the present invention.

With reference to FIG. 5, a synchronization channel and a midamble are disposed to be contiguous to different DL subframes. The midamble is disposed at a final portion of a first DL subframe and the synchronization channel is disposed at a first portion of a second DL subframe, so the midamble and the synchronization channel may be contiguous to each other. Or, when the synchronization channel occupies a separate OFDM symbol, rather than being included in the DL subframe, the midamble may be disposed at a final portion of the DL subframe contiguous to the synchronization channel. The MAP and the DL burst are as described above with reference to FIG. 4.

Figure 6:
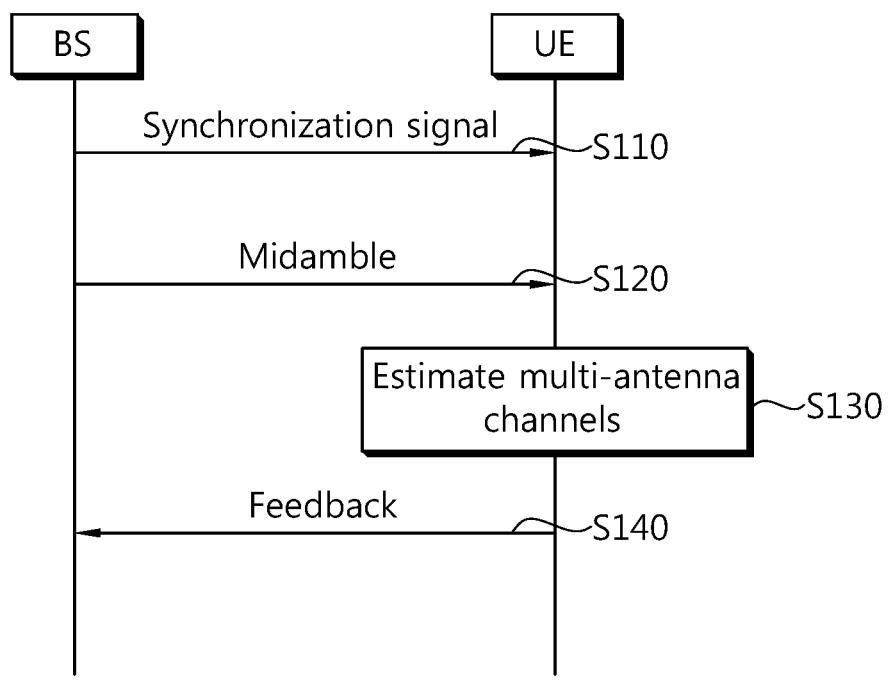
FIG. 6 is a flow chart illustrating the process of a data transmission method according to an exemplary embodiment of the present invention.

FIG. 6 is a flow chart illustrating the process of a data transmission method according to an exemplary embodiment of the present invention.

With reference to FIG. 6, a BS transmits a synchronization signal via a synchronization channel (step S110). The synchronization signal may be a reference signal (or pilot) for time synchronization, frequency synchronization, frame synchronization, a channel estimation, a BS ID, and the like. The synchronization channel may be divided into a P-SCH and an S-SCH, and in this case, the synchronization channel may be the S-SCH for a channel estimation.

The BS transmits a midamble (step S120). The midamble may be transmitted through an OFDM symbol contiguous to the synchronization channel. The midamble may be transmitted through an OFDM symbol contiguous to the synchronization channel in a subframe including the synchronization channel. Or, the midamble may be transmitted through the last OFDM symbol of the subframe ahead of the synchronization channel. Here, although the midamble is described to be transmitted after the synchronization signal, the transmission order of the synchronization signal and the midamble is not limited.

A UE estimates each channel of multiple antennas by using the received synchronization signal and the midamble (step S130). When a synchronization signal is transmitted through a single transmission antenna, the UE estimates a channel with respect to the transmission antenna which transmits the synchronization signal through the synchronization signal. And, the UE may estimate channels of the remaining transmission antennas through the midamble.

since the midamble is transmitted through an OFDM symbol contiguous to the synchronization channel or through an OFDM symbol at an interval with which the midamble and the synchronization channel can undergo the same channel environment, more accurate channel estimation can be performed. Contiguity of the midamble and the synchronization channel refers to that the midamble and the synchronization channel are adjacent at an interval with which the midamble and the synchronization channel can experience the same channel environment. The combination of multiple antennas or combined channels of transmission antennas can be estimated by using the continuously transmitted synchronization signal and midamble. To this end, the synchronization signal and the midamble may be transmitted as signals allowing for an estimation of the combination of multiple antennas or as signals allowing for an estimation of the combined channels of the transmission antennas. The UE can estimate channels with respect to all the transmission antennas by using the combination of the multiple antennas or the combined channels of the transmission antennas which have been estimated by using the synchronization signal and the midamble.

A method for estimating a channel of multiple antennas using a synchronization signal and a midamble will now be described. Cases in which the BS uses two transmission antennas and four transmission antennas will be described as examples, but the number of the transmission antennas is not limited in the present exemplary embodiment.

(1) When two transmission antennas are in use, channels in a combined form of multiple antennas can be estimated. Compared with the case in which channels of two transmission antennas are individually estimated by using a midamble, when a synchronization signal and a midamble contiguously transmitted are used, channels with respect to the respective transmission antennas can be more reliably estimated from the combined channels of the multiple antennas.

Equation 1 represent a signal $r_k$ received in a $k^{th}$ subcarrier of the synchronization signal and a signal $y_k$ received in a $k^{th}$ subcarrier of the midamble.

$$r_k = h_{1,k}\alpha_{1,k}s_k + h_{2,k}\alpha_{2,k}s_k + n_k$$

$$y_k = h_{1,k}\beta_{1,k}x_k + h_{2,k}\beta_{2,k}x_k + v_k \quad \text{[Equation 1]}$$

Here, $s_k$ is a sequence of the synchronization signal, $x_k$ is a sequence of the midamble, $\alpha_{m,k}$ and $\beta_{m,k}$ (m=1, 2) are combination coefficients, $h_{m,k}$ (m=1, 2) are channels with respect to two antennas, and $n_k$ and $v_k$ are noise. The sequences of the synchronization signal and the midamble are known by the BS and the UE, so the channels in a combined form of the multiple antennas can be estimated. Also, when the UE knows about a combination coefficient, it can estimate the channels of two antennas by using the reception signals of the synchronization signal and the midamble.

When a CDD (cyclic delay diversity) is employed, the reception signals of the synchronization signal and the midamble can be represented by Equation 2 shown below.

$$r_k = h_{1,k}s_k + h_{2,k}s_k e^{j\theta_k} + n_k$$

$$y_k = h_{1,k}x_k - h_{2,k}x_k e^{j\theta_k} + v_k \quad \text{[Equation 2]}$$

Here, $\theta_k$ is a delay value of CDD. The CDD delay value may be determined as a certain value. For example, a value smaller than a CP (cyclic prefix) may be used as the CDD delay value. Or, a value having a size similar to that of the CP may be used as the CDD delay value. There is no limitation in the CDD delay value. When the UE knows about a phase shift value, it can obtain $h_{m,k}$ (m=1, 2). If the UE does not know about the delay value, it can estimate $h_{1,k}$ and $h_{2,k}e^{j\theta_k}$. That is, the UE can simply separate the channels of the respective antennas from the reception signals of the synchronization signal and the midamble.

(2) When four transmission antennas are in use, channels in a combined form of the multiple antennas can be estimated.

Equation 3 shows a reception signal of a synchronization signal transmitted to allow for an estimation of channels in a combined form of four transmission antennas.

$$r_k = h_{1,k}\alpha_{1,k}s_k + h_{2,k}\alpha_{2,k}s_k + h_{3,k}\alpha_{3,k}s_k + h_{4,k}\alpha_{4,k}s_k + n_k \quad \text{[Equation 3]}$$

When only combined channels of the four transmission antennas can be estimated from the synchronization signal, three types of combinations are additionally provided from a midamble to allow for an estimation of $h_{m,k}$ (m=1, 2, 3, 4).

Table 1 shows an example in which a synchronization signal and a midamble are transmitted in a CDD pattern in the time and frequency domains. The CDD delay value may be determined as a certain value. Here, an example in which CDD delay values quite smaller than the CP are used as $\theta_{2k}$, $\theta_{3k}$, and $\theta_{4k}$ is shown. When the delay value is small, the reception signal can be received as a transparent signal. That is, a channel estimation is not required, and the UE, which receives only the synchronization signal, can transparently detect the transmission signals from the multiple antennas, as if it detected a transmission signal of a single antenna.

TABLE 1

| OFDM symbols | | | | | | | |
|---|---|---|---|---|---|---|---|
| Antenna 1 | | Antenna 2 | | Antenna 3 | | Antenna 4 | |
| SCH | midamble | SCH | midamble | SCH | midamble | SCH | midamble |
| ... | ... | ... | ... | ... | ... | ... | ... |
| $s_k$ | $a_k$ | $s_k e^{j\theta_{2,k}}$ | $-a_k e^{j\theta_{2,k}}$ | $s_k e^{j\theta_{3,k}}$ | $a_k e^{j\theta_{3,k}}$ | $s_k e^{j\theta_{4,k}}$ | $-a_k e^{j\theta_{4,k}}$ |
| | $b_k$ | | $b_k e^{j\theta_{2,k}}$ | | $-b_k e^{j\theta_{3,k}}$ | | $-b_k e^{j\theta_{4,k}}$ |
| | $c_k$ | | $-c_k e^{j\theta_{2,k}}$ | | $-c_k e^{j\theta_{3,k}}$ | | $c_k e^{j\theta_{4,k}}$ |
| $s_{k+1}$ | $a_{k+1}$ | $s_{k+1} e^{j\theta_{2,k+1}}$ | $-a_{k+1} e^{j\theta_{2,k+1}}$ | $s_{k+1} e^{j\theta_{3,k+1}}$ | $a_{k+1} e^{j\theta_{3,k+1}}$ | $s_{k+1} e^{j\theta_{4,k+1}}$ | $-a_{k+1} e^{j\theta_{4,k+1}}$ |
| | $b_{k+1}$ | | $b_{k+1} e^{j\theta_{2,k+1}}$ | | $-b_{k+1} e^{j\theta_{3,k+1}}$ | | $-b_{k+1} e^{j\theta_{4,k+1}}$ |
| | $c_{k+1}$ | | $-c_{k+1} e^{j\theta_{2,k+1}}$ | | $-c_{k+1} e^{j\theta_{3,k+1}}$ | | $c_{k+1} e^{j\theta_{4,k+1}}$ |

TABLE 1-continued

| OFDM symbols | | | | | | | |
|---|---|---|---|---|---|---|---|
| Antenna 1 | | Antenna 2 | | Antenna 3 | | Antenna 4 | |
| SCH | midamble | SCH | midamble | SCH | midamble | SCH | midamble |
| $s_{k+2}$ | $a_{k+2}$ $b_{k+2}$ $c_{k+2}$ | $s_{k+2}e^{j\theta_{2,k+2}}$ | $-a_{k+2}e^{j\theta_{2,k+2}}$ $b_{k+2}e^{j\theta_{2,k+2}}$ $-c_{k+2}e^{j\theta_{2,k+2}}$ | $s_{k+2}e^{j\theta_{3,k+2}}$ | $a_{k+2}e^{j\theta_{3,k+2}}$ $-b_{k+2}e^{j\theta_{3,k+2}}$ $-c_{k+2}e^{j\theta_{3,k+2}}$ | $s_{k+2}e^{j\theta_{4,k+2}}$ | $-a_{k+2}e^{j\theta_{4,k+2}}$ $-b_{k+2}e^{j\theta_{4,k+2}}$ $c_{k+2}e^{j\theta_{4,k+2}}$ |
| ... | ... | ... | ... | ... | ... | ... | ... |

The channels of the four transmission antennas are estimated in a combined form from the synchronization signal and the midamble. Since the UE knows about the combination coefficient, it can obtain the respective channels of the four transmission antennas from the four types of combined forms of channels.

Additional delay values ($\phi_{3,k}$, $\phi_{4,k}$) may be applied to the antennas 3 and 4, so the synchronization signal and the midamble may be transmitted in a different CDD pattern.

Table 2 below shows another example in which a synchronization signal and a midamble are transmitted in the CDD pattern in the time and frequency domains. CDD delay values quite smaller than the CP are used as $\theta_{2k}$, $\theta_{3k}$ and $\theta_{4k}$ and CDD delay values having a size similar to that of the CP are used as $\phi_{3,k}$ and $\phi_{4,k}$. That is, a CDD delay value smaller than the CP may be used for antenna 2, and CDD delay values each having a size similar to that of the CP may be used for antennas 3 and 4. A reception signal can be received as a transparent signal due to the small CDD delay value θ, and a great delay value may be used as φ so as not to overlap with various θ values.

only the midamble, but in this case, a more accurate channel estimation can be performed by using the synchronization signal.

(3) When four transmission antennas are in use, synchronization signal may be provided so as to estimate only channels in a combined form of two multiple antennas. A synchronization signal may be transmitted such that channels in a combined form of the antennas 1 and 2 and channels in a combined form of the antennas 3 and 4 among 4 transmission antennas can be estimated. That is, the plurality of antennas are divided into a plurality of antenna groups and channels in a combined form of the respective antenna groups are estimated to estimate channels of the respective transmission antennas.

Table 3 below shows another example in which a synchronization signal and a midamble are transmitted in the CDD pattern in the time and frequency domains. A CDD delay value quite smaller than the CP may be used for antenna 2, and CDD delay values each having a size similar to that of the

TABLE 2

| OFDM symbols | | | | | | | |
|---|---|---|---|---|---|---|---|
| Antenna 1 | | Antenna 2 | | Antenna 3 | | Antenna 4 | |
| SCH | midamble | SCH | midamble | SCH | midamble | SCH | midamble |
| ... | ... | ... | ... | ... | ... | ... | ... |
| $s_k$ | $a_k$ $b_k$ | $s_k e^{j\theta_{2,k}}$ | $-a_k e^{j\theta_{2,k}}$ $b_k e^{j\theta_{2,k}}$ | $s_k e^{j\theta_{3,k}}$ | $a_k e^{j(\theta_{3,k}+\phi_{3,k})}$ $b_k e^{j(\theta_{3,k}+\phi_{3,k})}$ | $s_k e^{j\theta_{4,k}}$ | $-a_k e^{j(\theta_{4,k}+\phi_{4,k})}$ $b_k e^{j(\theta_{4,k}+\phi_{4,k})}$ |
| $s_{k+1}$ | $a_{k+1}$ $b_{k+1}$ | $s_{k+1} e^{j\theta_{2,k+1}}$ | $a_{k+1}e^{j\theta_{2,k+1}}$ $b_{k+1}e^{j\theta_{2,k+1}}$ | $s_{k+1}e^{j\theta_{3,k+1}}$ | $a_{k+1}e^{j(\theta_{3,k+1}+\phi_{3,k+1})}$ $b_{k+1}e^{j(\theta_{3,k+1}+\phi_{3,k+1})}$ | $s_{k+1}e^{j\theta_{4,k+1}}$ | $-a_{k+1}e^{j(\theta_{4,k+1}+\phi_{4,k+1})}$ $b_{k+1}e^{j(\theta_{4,k+1}+\phi_{4,k+1})}$ |
| $s_{k+2}$ | $a_{k+2}$ $b_{k+2}$ | $s_{k+2}e^{j\theta_{2,k+2}}$ | $a_{k+2}e^{j\theta_{2,k+2}}$ $b_{k+2}e^{j\theta_{2,k+2}}$ | $s_{k+2}e^{j\theta_{3,k+2}}$ | $a_{k+2}e^{j(\theta_{3,k+2}+\phi_{3,k+2})}$ $b_{k+2}e^{j(\theta_{3,k+2}+\phi_{3,k+2})}$ | $s_{k+2}e^{j\theta_{4,k+2}}$ | $-a_{k+2}e^{j(\theta_{4,k+1}+\phi_{4,k+1})}$ $b_{k+2}e^{j(\theta_{4,k+1}+\phi_{4,k+1})}$ |
| ... | ... | ... | ... | ... | ... | ... | ... |

When a CDD delay value smaller than the CP is used for antenna 2 and CDD delay values each having a size similar to that of the CP are used for antennas 3 and 4, the channels of the four transmission antennas can be all obtained by using CP may be used for antennas 3 and 4. For example, a CDD delay value quite smaller than the CP may be used as $\theta_{2k}$, and great CDD delay value, similar CDD delay values each having a size similar to that of the CP, may be used as $\theta_{3k}$ and $\theta_{4k}$.

TABLE 3

| OFDM symbols | | | | | | | |
|---|---|---|---|---|---|---|---|
| Antenna 1 | | Antenna 2 | | Antenna 3 | | Antenna 4 | |
| SCH | midamble | SCH | midamble | SCH | midamble | SCH | midamble |
| ... | ... | ... | ... | ... | ... | ... | ... |
| $s_k$ | $a_k$ | $s_k e^{j\theta_{2,k}}$ | $-a_k e^{j\theta_{2,k}}$ | $s_k e^{j\theta_{3,k}}$ | $a_k e^{j\theta_{3,k}}$ | $s_k e^{j\theta_{4,k}}$ | $-a_k e^{j\theta_{4,k}}$ |
| $s_{k+1}$ | $a_{k+1}$ | $s_{k+1}e^{j\theta_{2,k+1}}$ | $-a_{k+1}e^{j\theta_{2,k+1}}$ | $s_{k+1}e^{j\theta_{3,k+1}}$ | $a_{k+1}e^{j\theta_{3,k+1}}$ | $s_{k+1}e^{j\theta_{4,k+1}}$ | $-a_{k+1}e^{j\theta_{4,k+1}}$ |

TABLE 3-continued

| OFDM symbols | | | | | | | |
|---|---|---|---|---|---|---|---|
| Antenna 1 | | Antenna 2 | | Antenna 3 | | Antenna 4 | |
| SCH | midamble | SCH | midamble | SCH | midamble | SCH | midamble |
| $s_{k+2}$ | $a_{k+2}$ | $s_{k+2}e^{j\theta_2,k+2}$ | $-a_{k+2}e^{j\theta_2,k+2}$ | $s_{k+2}e^{j\theta_3,k+2}$ | $a_{k+2}e^{j\theta_3,k+2}$ | $s_{k+2}e^{j\theta_4,k+2}$ | $-a_{k+2}e^{j\theta_4,k+2}$ |
| ... | ... | ... | ... | ... | ... | ... | ... |

The channels of the antennas 1 and 2 can be separately estimated by using the channels in the combined form of the antennas 1 and 2 obtained from the synchronization signal and the channels in the combined form of the antennas 1 and 2 obtained from the midamble. Also, the channels of the antennas 3 and 4 can be separately estimated by using the channels in the combined form of the antennas 3 and 4 obtained from the synchronization signal and the channels in the combined form of the antennas 3 and 4 obtained from the midamble. That is, the channels of the respective antennas can be estimated from the channels in a combined form of the two paired antennas of the four antennas by using the synchronization signals and the midambles. Meanwhile, in order to separate the antennas 1 and the antennas 3 and 4 from the midambles, a great CDD delay value may be used or a different sequence may be used.

In order to discriminate the antennas 1 and 2 and the antennas 3 and 4, the midambles for the antennas 1 and 2 and the antennas 3 and 4 may use different frequency tones.

Table 4 below shows another example in which a synchronization signal and a midamble are transmitted in the CDD pattern in the time and frequency domains. CDD delay values quite smaller than the CP may be used as CDD delay values of the antennas 2, 3, and 4. For example, CDD delay values quite smaller than the CP may be used as $\theta_{2k}$, $\theta_{3k}$ and $\theta_{4k}$, and in order to discriminate the antennas 1 and 2 and the antennas 3 and 4 from the midambles, different frequency tones may be used.

TABLE 4

| OFDM symbols | | | | | | | |
|---|---|---|---|---|---|---|---|
| Antenna 1 | | Antenna 2 | | Antenna 3 | | Antenna 4 | |
| SCH | midamble | SCH | midamble | SCH | midamble | SCH | midamble |
| ... | ... | ... | ... | ... | ... | ... | ... |
| $s_k$ | $a_k$ | $s_k e^{j\theta_2,k}$ | $-a_k e^{j\theta_2,k}$ | $s_k e^{j\theta_3,k}$ | | $s_k e^{j\theta_4,k}$ | |
| $s_{k+1}$ | | $s_{k+1}e^{j\theta_2,k+1}$ | | $s_{k+1}e^{j\theta_3,k+1}$ | $b_{k+1}e^{j\theta_3,k+1}$ | $s_{k+1}e^{j\theta_4,k+1}$ | $-b_{k+1}e^{j\theta_4,k+1}$ |
| $s_{k+2}$ | $a_{k+2}$ | $s_{k+2}e^{j\theta_2,k+2}$ | $-a_{k+2}e^{j\theta_2,k+2}$ | $s_{k+2}e^{j\theta_3,k+2}$ | | $s_{k+2}e^{j\theta_4,k+2}$ | |
| $s_{k+3}$ | | $s_{k+3}e^{j\theta_2,k+3}$ | | $s_{k+3}e^{j\theta_3,k+3}$ | $b^{k+3}e^{j\theta_3,k+3}$ | $s_{k+3}e^{j\theta_4,k+3}$ | $-b_{k+3}e^{j\theta_4,k+3}$ |
| ... | ... | ... | ... | ... | ... | ... | ... |

So far, the examples in which CDD delay values are applied for each antenna have been described. However, this is merely illustrative. That is, there is no limitation in the size of the CDD delay values used for the antennas and there is no limitation in the order and number of the antennas for which the CDD delay values are used.

In this manner, the synchronization channel and the midamble are configured to be contiguous so as not cause a great change in channels and the combined channels of the multiple antennas are estimated by using the synchronization signal and the midamble transmitted therethrough, thereby effectively estimating the channels of the respective antennas.

The UE may transmit a feedback signal to the BS on the basis of the estimated channels (step S140). The feedback signal may include a CQI (channel quality indicator), a PMI (precoding matrix indicator) for codebook-based precoding in multiple antenna system, an RI (rank indicator), and the like.

Figure 7:
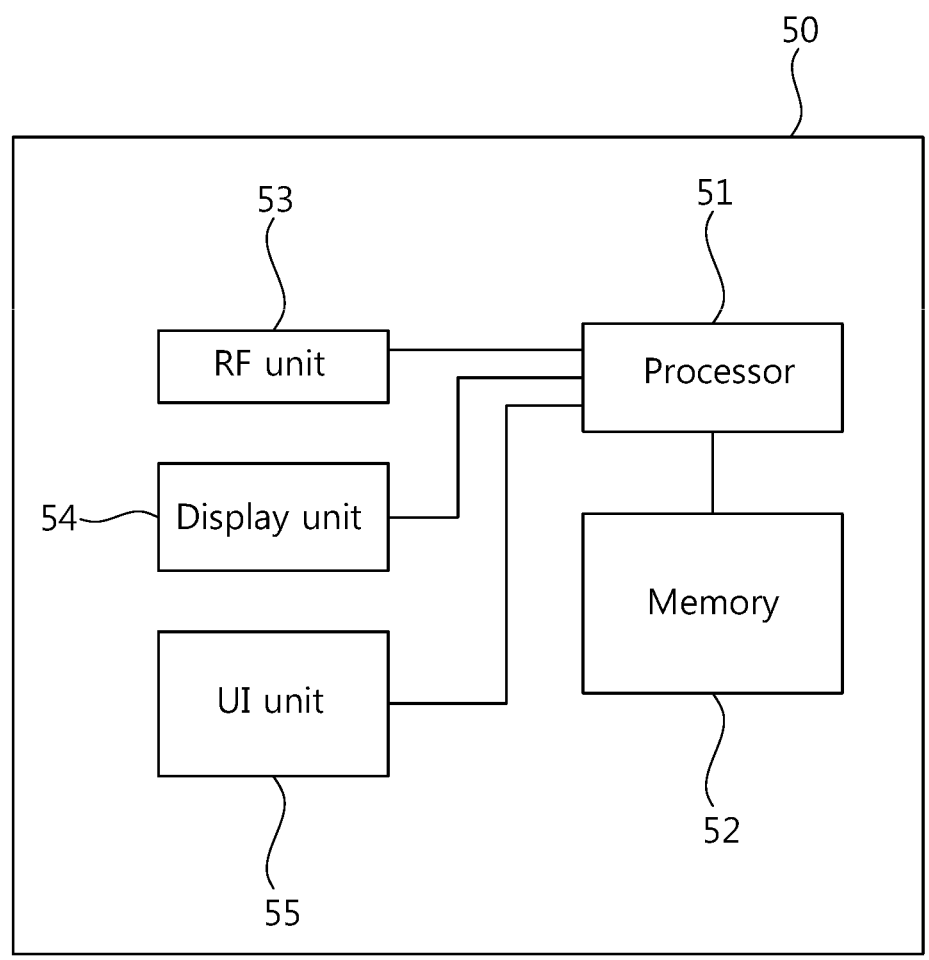
FIG. 7 is a schematic block diagram of a user equipment (UE).

FIG. 7 is a schematic block diagram of a user equipment (UE).

With reference to FIG. 7, a UE 50 includes a processor 51, a memory 52, an RF unit 53, a display unit 54, and a user interface (UI) unit 55. The processor 51 implements layers of a radio interface protocol to provide a control plane and a user plane. The functions of the respective layers can be implemented through the processor 51. The processor 51 performs a channel estimation on multiple antennas using the foregoing synchronization signal and the midamble.

The memory 52, connected to the processor 51, stores a UE driving system, an application, and a general file. The display unit 54 displays various types of information of the UE, and may use well-known elements such as LCD (Liquid Crystal Display), OLED (Organic Light Emitting Diodes), or the like. The UI unit 55 may be configured as a combination of well-known UIs such as a keypad, a touch screen, and the like. The RF unit 53, connected to the processor 51, transmits and/or receives a radio signal.

The layers of the radio interface protocol between the UE and a network can be divided into L1 (a first layer), L2 (a second layer), and L3 (a third layer) based on the lower three layers of the OSI (Open System Interconnection) model widely known in communication systems. Among them, a physical layer belonging to the first layer provides an information transfer service using a physical channel, and a radio resource control (RRC) layer positioned at the third layer serves to control radio resources between the UE and the network. To this end, the RRC layers exchange an RRC message between the UE and the network.

All the foregoing functions may be performed by processors such as a microprocessor, a controller, a microcontroller, an ASIC (Application Specific Integrated Circuit), or the like, according to software, program codes, or the like, coded to perform the functions. Designing, developing, and implementing the codes may be obvious to a person skilled in the art based on the description of the present invention.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

The invention claimed is:

1. A method for channel estimation, performed by a user equipment (UE), in a wireless communication system, the method comprising:
   receiving synchronization signals and midambles transmitted through a plurality of antennas of a base station; and
   estimating each channel of the plurality of antennas by using the synchronization signals and the midambles,
   wherein the synchronization signals and the midambles are transmitted such that channels of the plurality of antennas are combined,
   wherein the plurality of antennas are divided into a plurality of antenna groups, and the synchronization signals and the midambles are transmitted such that the channels of the plurality of antennas belonging to the plurality of antenna groups are combined and
   wherein the midambles are transmitted through different frequency tones by antenna groups.

2. The method of claim 1, wherein the synchronization signals and the midambles are transmitted through OFDM symbols contiguous in a time domain.

3. The method of claim 1, wherein different delay values with respect to antennas are applied to the synchronization signals and the midambles of the plurality of antennas according to a cyclic delay diversity when the synchronization signals and the midambles are transmitted.

4. The method of claim 3, wherein an additional delay value is applied to some of the plurality of antennas.

5. A user equipment (UE) comprising:
   a radio frequency (RF) unit configured to receive synchronization signals and midambles transmitted through a plurality of antennas; and
   a processor connected to the RF unit and estimating respective channels of the plurality of antennas by using the synchronization signals and the midambles, wherein the synchronization signals and the midambles are transmitted such that the channels of the plurality of antennas are combined,
   wherein the plurality of antennas are divided into a plurality of antenna groups, and the synchronization signals and the midambles are transmitted such that the channels of the plurality of antennas belonging to the plurality of antenna groups are combined and
   wherein the midambles are transmitted through different frequency tones by antenna groups.

* * * * *